April 2, 1963  R. F. BAUER ETAL  3,083,842
PIPE HANDLING APPARATUS
Filed March 28, 1957  10 Sheets-Sheet 3

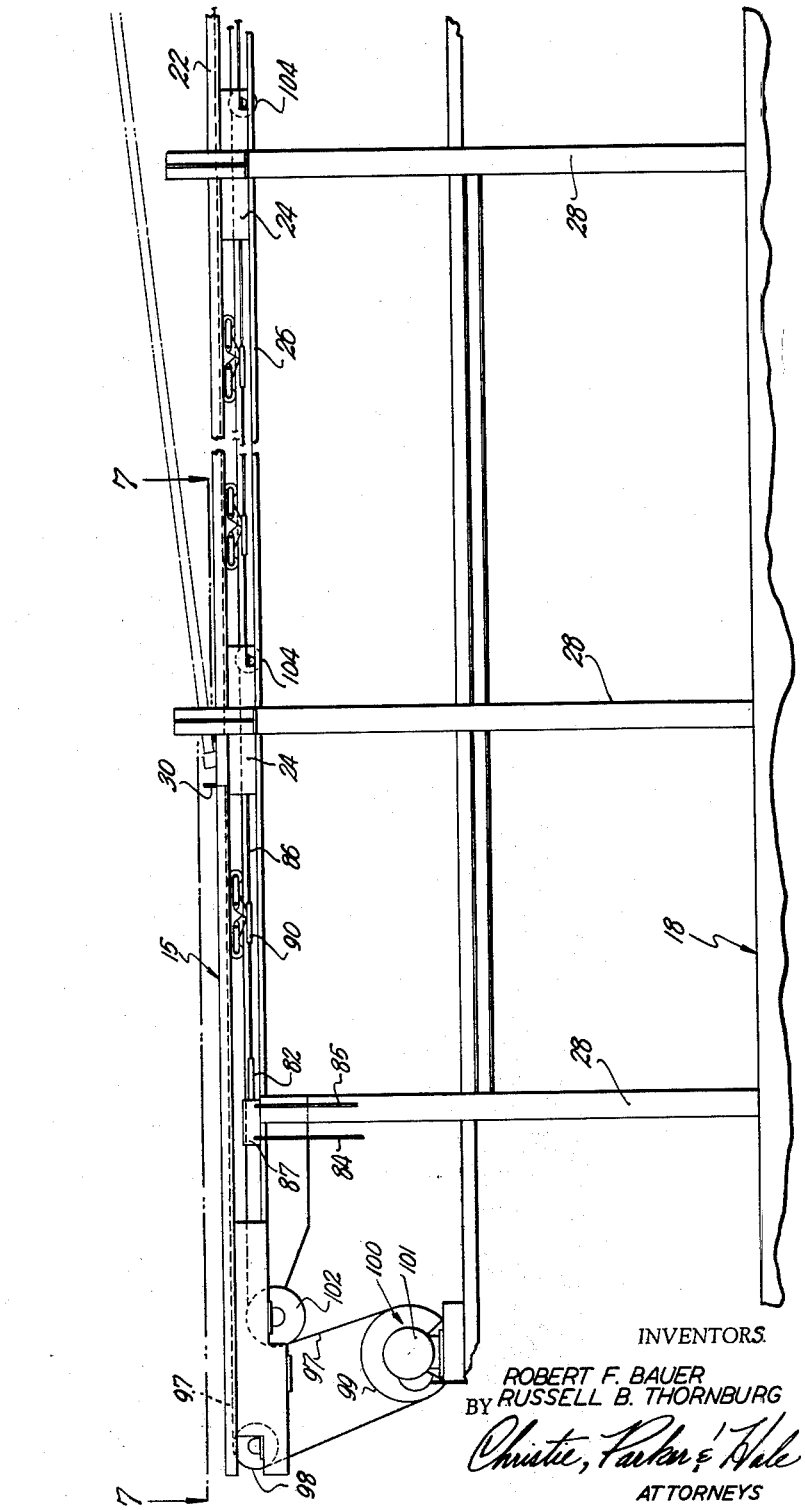

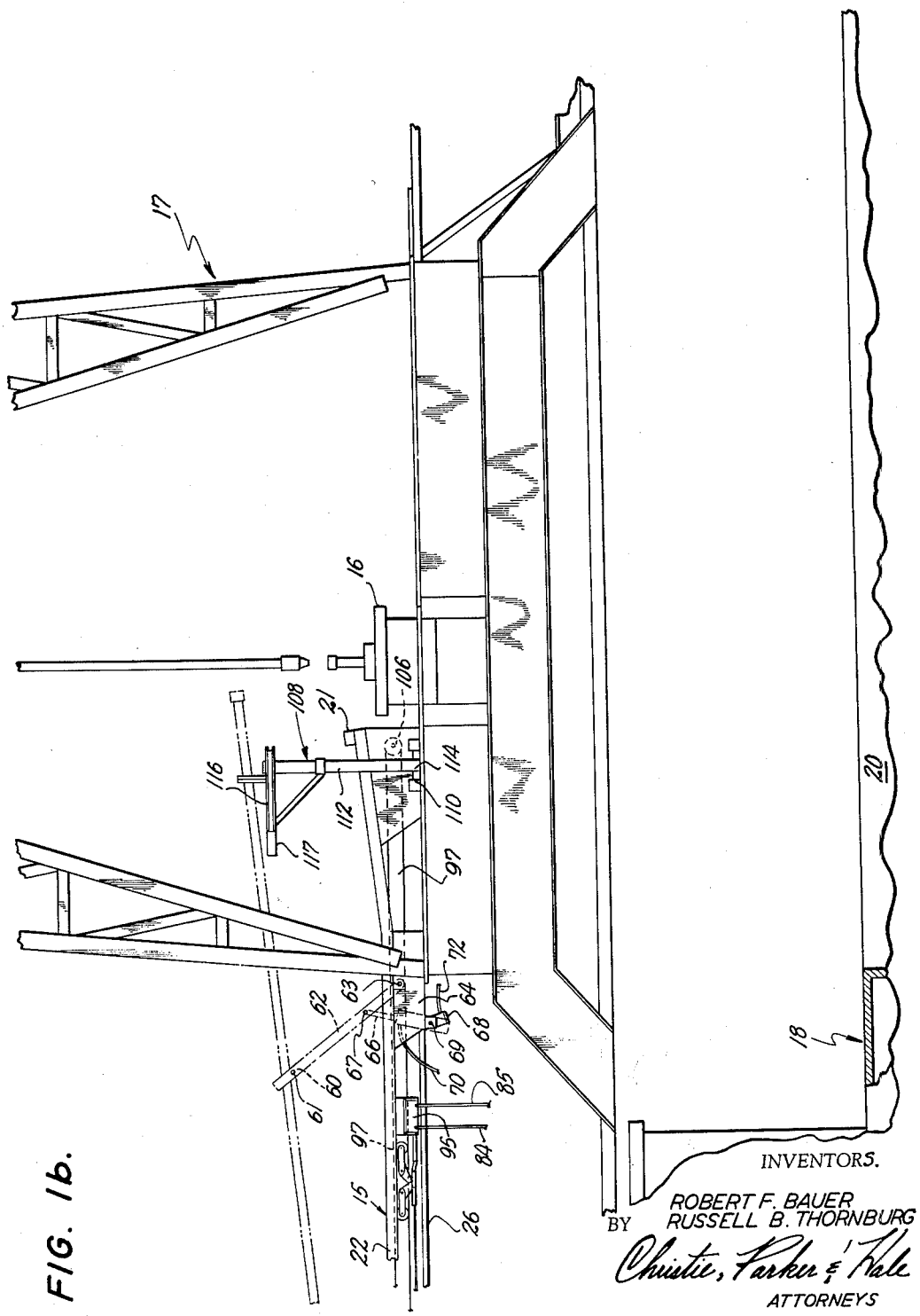

INVENTORS.
ROBERT F. BAUER
BY RUSSELL B. THORNBURG
Christie, Parker & Hale
ATTORNEYS

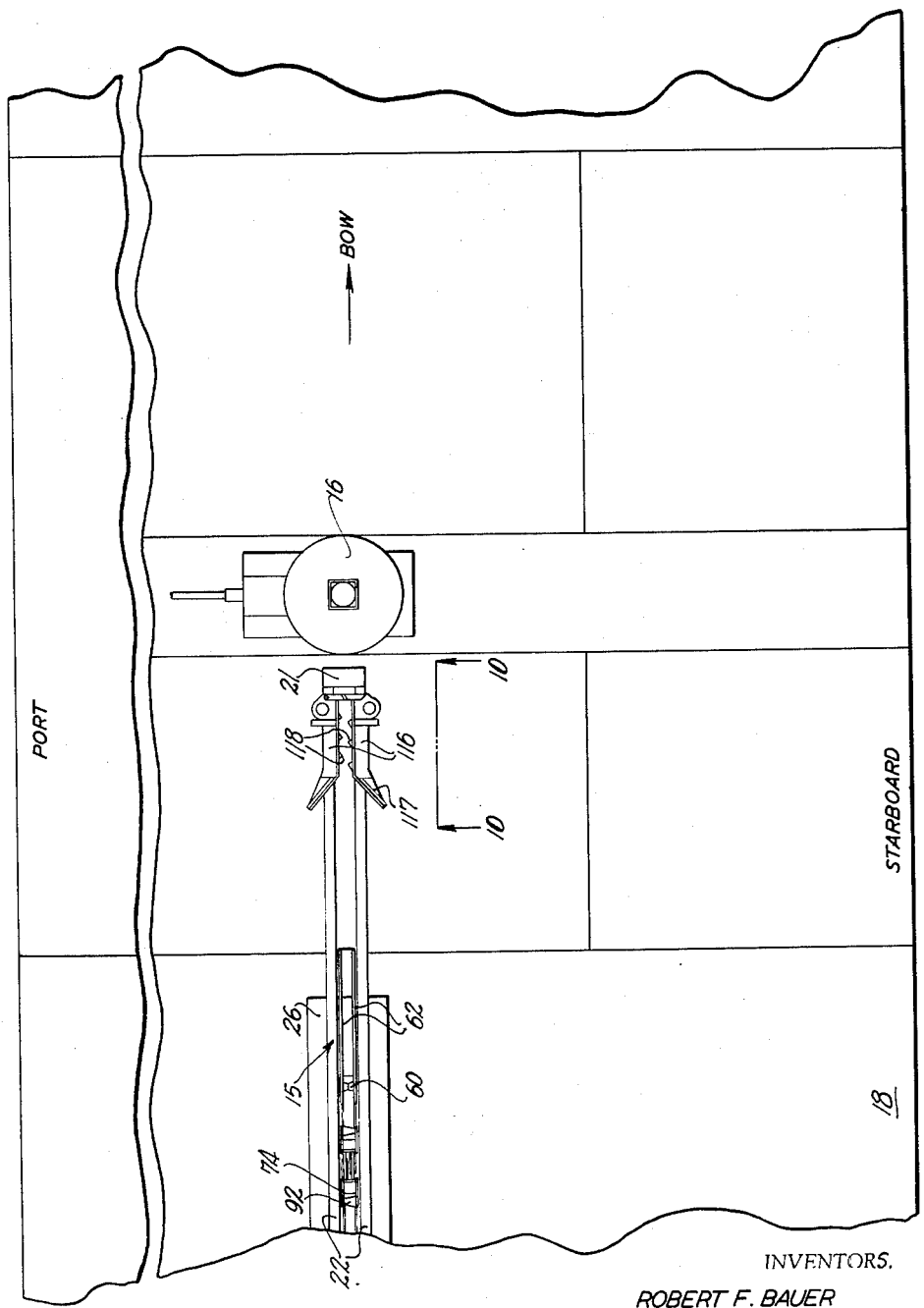

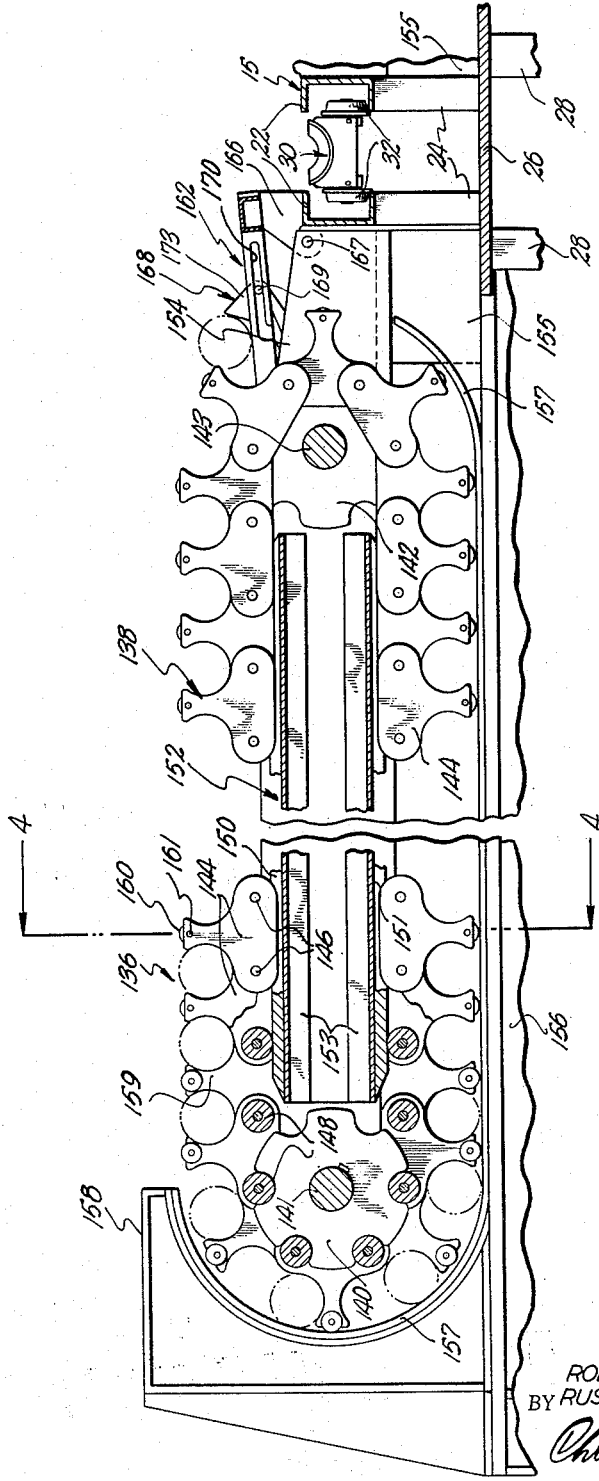

April 2, 1963  R. F. BAUER ETAL  3,083,842
PIPE HANDLING APPARATUS
Filed March 28, 1957  10 Sheets-Sheet 6
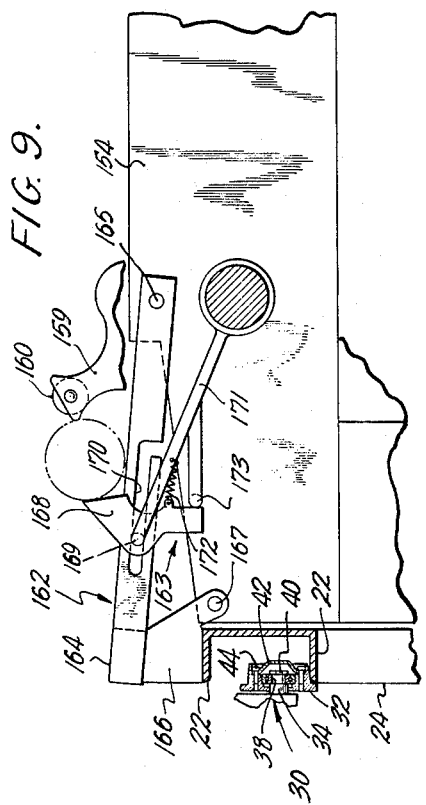
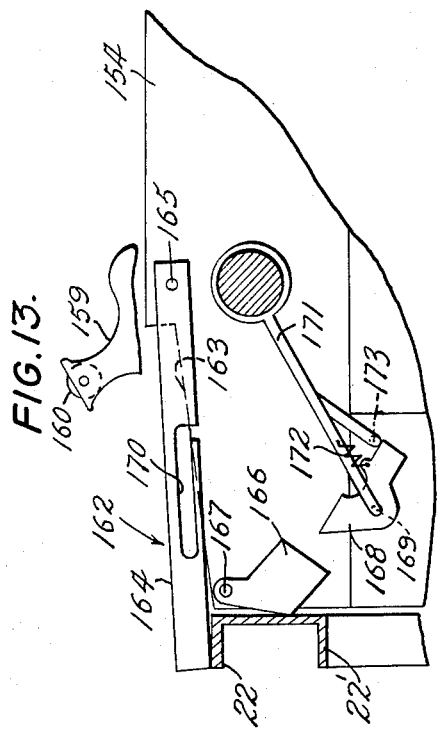
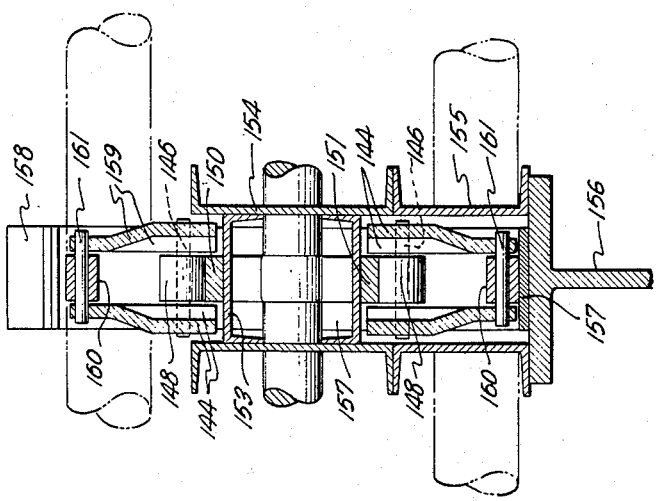
INVENTORS.
ROBERT F. BAUER
BY RUSSELL B. THORNBURG
*Christie, Parker & Hale*
ATTORNEYS April 2, 1963 R. F. BAUER ETAL 3,083,842
PIPE HANDLING APPARATUS
Filed March 28, 1957 10 Sheets-Sheet 7

INVENTORS.
ROBERT F. BAUER
BY RUSSELL B. THORNBURG

Christie, Parker & Hale
ATTORNEYS

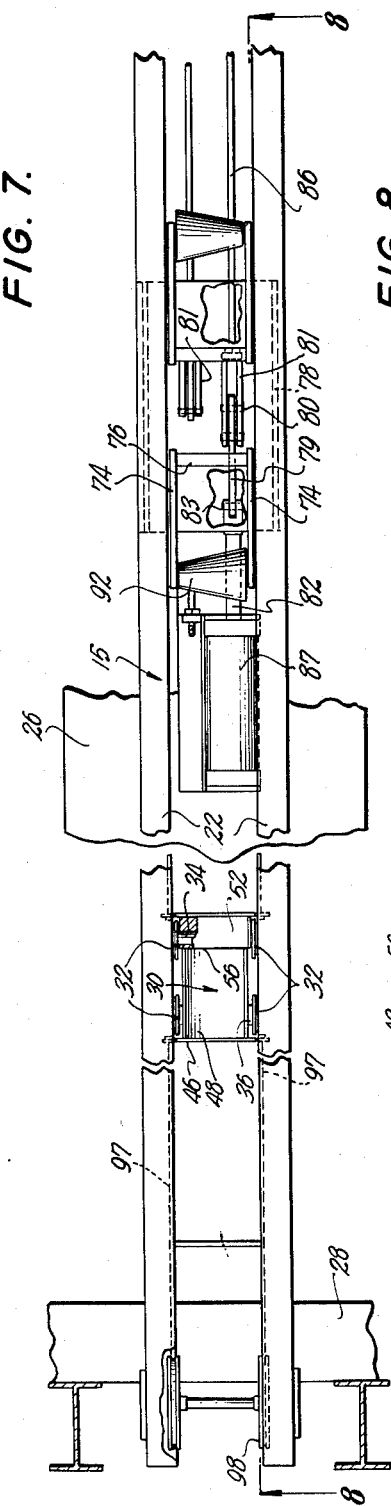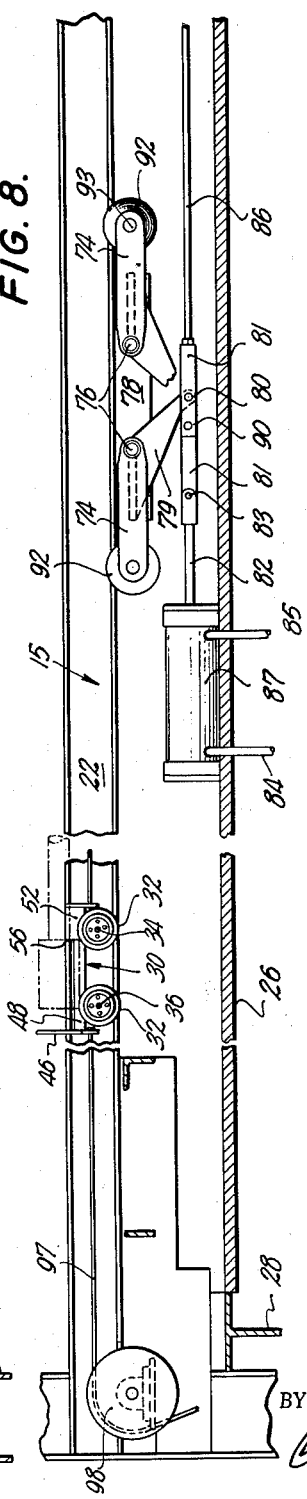

April 2, 1963  R. F. BAUER ETAL  3,083,842
PIPE HANDLING APPARATUS

Filed March 28, 1957  10 Sheets-Sheet 9

INVENTORS.
ROBERT F. BAUER
BY RUSSELL B. THORNBURG

*Christie, Parker & Hale*
ATTORNEYS

INVENTORS.
ROBERT F. BAUER
BY RUSSELL B. THORNBURG
ATTORNEYS

3,083,842
PIPE HANDLING APPARATUS

Robert F. Bauer, Whittier, and Russell B. Thornburg, Watsonville, Calif., assignors to Shell Oil Company and Continental Oil Company, both of Los Angeles, Calif., and both corporations of Delaware, and to The Superior Oil Company and Union Oil Company of California, both of Los Angeles, Calif., and both corporations of California Filed Mar. 28, 1957, Ser. No. 649,099
4 Claims. (Cl. 214—2.5)

This invention provides pipe handling apparatus which is particularly suitable for use on a floating drilling vessel.

One of the problems in drilling an underwater well from a floating vessel is the handling of the large quantities of drill pipe necessary for the drilling operation, particularly in making trips in and out of the well with drill pipe. In conventional onshore drilling, the drill pipe is stacked in vertical sections or "stands" inside the derrick as trips are made in and out of the well. However, this procedure is not practical in drilling from a floating vessel because of the hazards presented by the pitching and rolling of the vessel due to wave action which is almost invariably present. Not only is there the danger of vertically stacked pipe shifting and causing injury or damage, but the vertical stacking of large quantities of drill pipe inside a derrick on a floating vessel would decrease the stability of the vessel.

This invention provides pipe handling apparatus for an almost fully automatic operation for racking and securely storing the drill pipe sections in a stable horizontal position when the pipe is not in use for drilling.

The apparatus permits successive sections of drill pipe to be moved quickly and safely from a horizontal position to a vertical position when drill pipe is being lowered into the well, and, conversely, permits successive sections of drill pipe to be lowered quickly and safely from a vertical to a horizontal position when drill pipe is being taken from the well.

Briefly, the invention contemplates pipe handling and racking apparatus which comprises a track adapted to extend from an inner end adjacent a drilling rig to an outer end remote from the rig. A carriage is adapted to travel on the track between an outer and an inner position to support a section of pipe. The apparatus also includes means to displace a section of pipe from a rest position along the track to a laterally displaced position.

In the preferred form, a pipe racking conveyor is disposed adjacent the track so that individual sections of pipe may be successively fed in a horizontal position from the racking conveyor on to the track, or conversely, from the track into the racking conveyor.

The pipe racking conveyor includes a pair of rotatable supports with an endless belt disposed around the supports. A plurality of pipe storage spaces are formed between adjacent pipe retainers which extend outwardly from the belt. Means are provided for moving the belt in either direction so that sections of pipe may be carried to or from the track.

When the apparatus is used on a floating vessel, the track preferably lies on the longitudinal center line of the vessel and a separate pipe racking conveyor is disposed on each side of the track. Means are provided for displacing a section of the pipe from the track to either racking conveyor. Also in the preferred form, each racking conveyor includes a pair of longitudinally spaced belts and supports so that sections of pipe are supported at spaced locations.

These and other aspects of the invention will be more fully understood from the following detailed description taken in conjunction with the accompanying drawings in which:

FIGS. 1a and 1b are a fragmentary side elevation of the pipe handling apparatus of this invention mounted adjacent a derrick on a floating vessel;

FIGS. 2a and 2b are a fragmentary plan view of the apparatus of FIG. 1;

FIG. 3 is a fragmentary transverse elevation, partly in section, taken on line 3—3 of FIG. 2 of one pipe racking conveyor, the track and the carriage;

FIG. 4 is a view taken on line 4—4 of FIG. 3;

FIG. 7 is a fragmentary plan view, partially broken away, taken on line 7—7 of FIG. 1 of the carriage and a set of kick-off arms for laterally displacing pipe from the track;

FIG. 8 is a fragmentary view taken on line 8—8 of FIG. 7;

FIG. 9 is a view taken on line 9—9 of FIG. 2a showing a ramp and pipe stop used in transferring pipe from the track to the conveyor;

FIG. 13 is a view similar to FIG. 9 showing the ramp and pipe stop used in transferring pipe from the conveyor to the track.

Figure 2A:
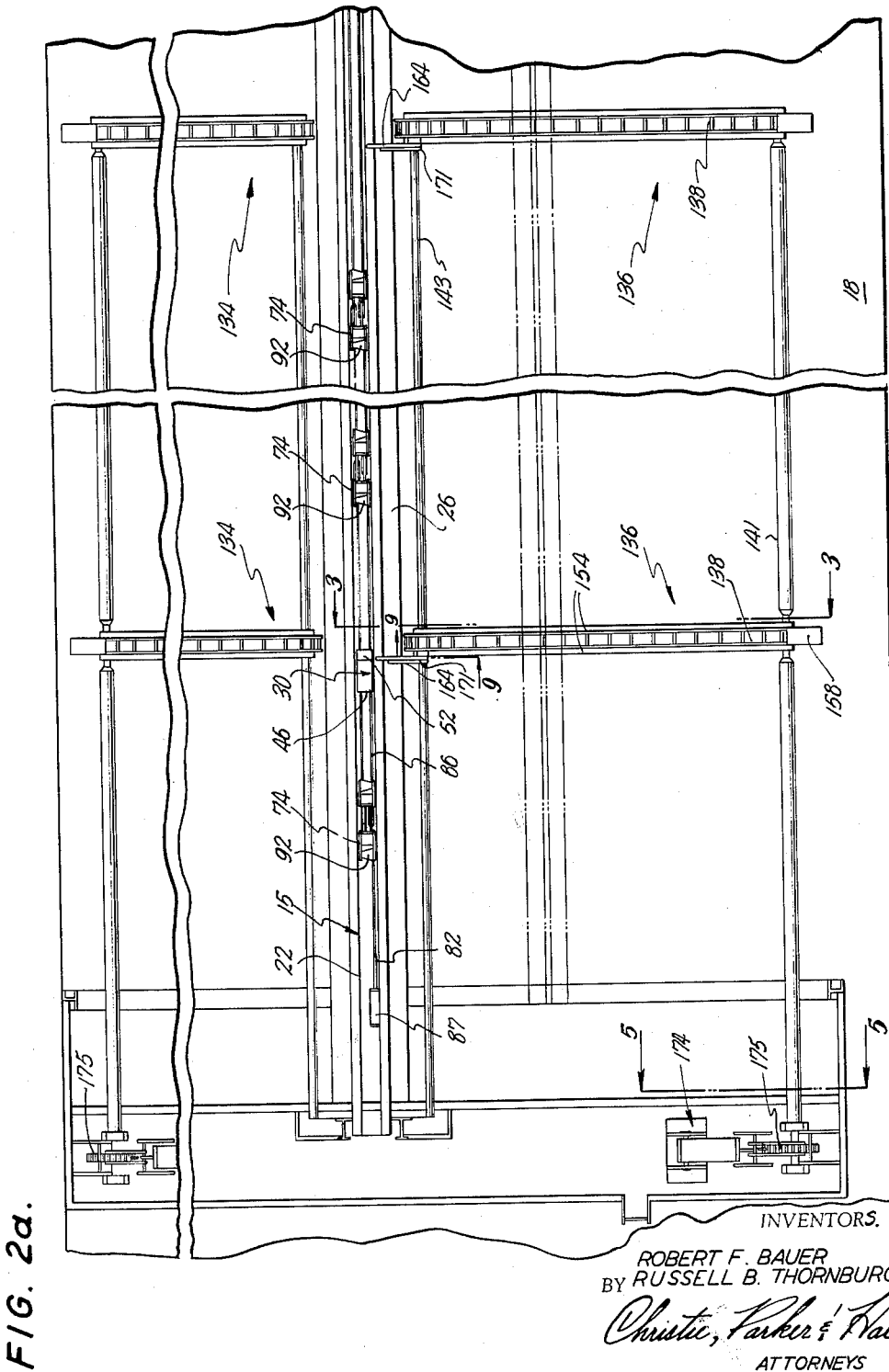

Referring to FIGS. 1a through 2b, an elongated track 15 has its inner end disposed adjacent and to the rear of a rotary table 16 of a drilling rig 17 mounted on the deck of a floating vessel 18. The drilling rig is located midships over a centrally located well 20 which opens from the deck of the vessel into the water in which the vessel is floating. The inner end portion of the track is inclined slightly to slope downwardly and away from the rotary table, and the remainder of the track extends rearwardly and horizontally along the center line of the vessel to terminate at its outer end adjacent the stern of the vessel. An upright carriage stop 21 is at the inner end of the inclined section of the track.

The track to the rear of the inclined inner end includes a pair of horizontal, laterally spaced, parallel, and inwardly opening channel beams 22 (see FIG. 3) supported on a plurality of longitudinally spaced blocks 24 welded to the upper surface of an elongated and horizontal support plate 26, which in turn is supported by upright braces 28 from the deck of the vessel. The inner end of the track is welded to the horizontal portion of the track and similarly constructed, except that it is slightly inclined, as mentioned above.

A carriage 30 is adapted to ride on the lower lips of the track channel beams on four railway-type wheels 32, which are journalled on the ends of front and rear shafts 34, 36, respectively (see FIG. 7), by roller bearings 38 (see FIG. 9) held to the outer end of each shaft by a separate nut 40. A separate cap 42 is secured by capscrews 44 to each wheel over the outer end of each shaft and bearing. A vertical and transverse buckboard 46 (see FIG. 8) is secured to the rear end of a carriage body 48 which is attached to the carriage shafts. The upper surface of the body has an upwardly opening concave surface to match the curvature of a section of pipe (shown only in phantom lines) having its rear end resting on the carriage body and extending forward along the track. A retaining block 52 having an upwardly opening concave upper surface is secured to the forward end of the carriage body and projects slightly above the upper surface of the carriage body to form a shoulder 56 to engage a drill pipe coupling (shown only in phantom line) on the rear end of the drill pipe resting on the carriage.

Referring to FIGS. 1b and 2b, the forward end of the pipe in the track rests on a lifter roller 60 mounted to rotate on a horizontal and transverse shaft 61 attached at each end to the rear ends of a pair of laterally spaced longitudinal lifter arms 62 which are each connected at their forward ends by horizontal and transverse pivots 63 to the inside of separate downwardly extending brackets 64 provided on the underside of each track channel. The lifter roller tapers to an increased diameter at each end so that the section of pipe tends to lie in the center of the roller.

The upper end of a lifter piston 66 is attached by a horizontal and transverse pivot 67 to an intermediate portion of each lifter arm, and the piston extends down into a lifter cylinder 68 which is secured by a horizontal and transverse pivot 69 to each bracket 64. The piston and lifter arm are raised and lowered by air pressure supplied to the upper and lower ends of the lifter cylinder by lines 70 and 72, respectively, in a manner described in detail below.

Four longitudinally spaced port throw-out arms 74 (see FIGS. 2a, 2b, 7 and 8) are secured by separate respective transverse and horizontal pivots 76 to a separate respective bracket 78 secured to the underside of the track. Each throw-out arm lies in a common vertical plane which passes between the track beams, and each throw-out arm includes a downwardly and forwardly extending leg 79 attached integrally to a respective arm at the throw-out pivot. The lower end of each leg 79 is connected by transverse and horizontal pivot 80 to a relatively short horizontal and longitudinal actuating link 81. The forward end of a port throw-out piston 82 is connected by a pivot 83 to the rear end of the actuating link 81 of the rearmost port throw-out assembly. The rear end of the port throw-out piston extends into a port throw-out cylinder 87 and is actuated by air supplied to the rear and forward ends of the cylinder through lines 84 and 85, respectively, as described in detail below. The rear end of a port throw-out rod 86 is connected to the forward end of the rearmost link, and is attached at its forward end by a horizontal and transverse pivot (not shown) to the next actuating link. The succeeding links are similarly connected by rods so that the actuation of the port throw-out piston produces simultaneous movement of all the port actuator links.

A separate conical port throw-out roller 92 is mounted on a horizontal and transverse shaft 93 at the rear end of each port throw-out arm. Each throw-out roller normally lies near the same level as that of the lower surface of the track channel beams, and decreases in diameter from the starboard to the port end so that as the links are actuated to move the port throw-out arms and rollers upwardly, a secton of pipe lying in the track is lifted and caused to slide to port.

A similar arrangement of four starboard pipe throw-out units are located adjacent the port throw-out units and are of identical construction, except that they are actuated by a starboard throw-out cylinder 95 (see FIG. 1b) secured at the forward and underside of the track, and the starboard throw-out rollers are tapered in the opposite direction from the port throw-out rollers so that when the starboard throw-out units are actuated, a section of pipe lifted from the track is caused to move laterally to starboard. Since the construction of the starboard throw-out units are virtually identical to that of the port throw-out units, their detailed description is omitted.

The carriage is moved fore and aft on the track by a carriage cable 97 (see FIG. 1a) which has its rear end attached to the bottom of the carriage buckboard (see FIG. 8) and its forward end attached to the forward end of the carriage. The carriage cable extends rearwardly from the carriage over a first cable pulley 98 at the aft end of the track and around a driving drum 99 which is powered through a clutch 100 by a pneumatic carriage motor 101. The motor and driving drum are mounted below the rear end of the track, and the driving drum is adapted to rotate about a transverse and horizontal axis. The carriage cable extends upwardly from the driving drum around a second cable pulley 102 mounted on track just below and forward of the first cable pulley. The cable extends forward over three longitudinally spaced guide pulleys 104 and up around a forward pulley 106 at the forward end of the track. The carriage cable extends from the forward pulley back to the carriage. Thus, by suitable operation of the carriage motor, as described in detail below, the carriage can be moved fore and aft on the track.

Referring to FIGS. 1b, 2b, 10 and 11, a vertical pick-up post 108 is inserted at its lower end in a socket 110 at the forward end of the track. The pick-up post includes a pair of laterally spaced vertical legs 112 welded at their lower ends to a rectangular base 114 which fits into the pick-up post socket.

The forward end of a longitudinal and horizontal pick-up post arm 116 is welded to the upper end of each pick-up post leg. The rear end of each pick-up post arm has a rearwardly and outwardly extending guide 117 which aids in guiding pipe into the space between the arms. A series of longitudinally spaced pawls 118 are mounted in each pick-up post arm to pivot about vertical axes and extend into the space between the arms. The pawls on one arm are located in staggered relationship to the pawls on the other arm and are each urged by a tension spring 120 inwardly against a stop 122.

A separate transverse gate 124 is connected by a vertical pivot 126 at its outer end to the forward end of each guide arm. Each gate extends inwardly to the center of the pick-up post to close the forward end of the space between the pick-up arms. The inner end of each gate is urged by a coil spring 127 around pivot 126 in a rearward direction so that each gate is ordinarily held against the forward end of its respective arm in the closed position shown in FIG. 2.

Each gate has a longitudinal and horizontal latch 128 which is secured intermediate its ends by a vertical pivot 129 to an intermediate portion of its respective gate. The rear end of the latch has a hook shaped portion 130 adapted to fit in a lock 131 attached to the respective arm to which the gate is pivoted. A downwardly extending handle 132 is attached at its upper end to the under surface of the forward portion of latch 128. Thus, coil spring 127 urges each gate so that each latch engages its respective lock to hold the gates shut, closing off the space between the forward ends of the pick-up post arms. Each latch is released from its respective lock by pulling each respective handle in an outwardly direction.

With the gates locked in the closed position as shown in FIG. 2b, a pipe which is supported at its forward end by elevators (not shown) on the drilling rig and at its rear end on the carriage, is pulled upwardly by the elevators toward the drilling rig, the rear end of the pipe riding on the carriage. As the pipe assumes a nearly vertical position, its lower end leaves the carriage and swings into the rear end of the space between the pick-up post arms, slides past the pick-up post pawls, and comes to rest against the pick-up post gates where it is securely held until released by manual operation of the gate lock handles.

As shown in FIG. 2a, port and starboard pipe racking conveyors 134, 136, respectively, are located on each side of the track. The two racking conveyors are substantially identical, and only the starboard racking conveyor is described in detail.

Referring to FIG. 3, the starboard racking conveyor includes a pair of fore and aft spaced endless conveyor chain belts 138 which are each adapted to move in a direction perpendicular to the track. A plurality of sections of drill pipe (shown only in phantom line) extend horizontally and longitudinally across the belts and are supported and held securely on them. The upper and lower sections of each of the belts are adapted to be moved, as described in detail below, toward and away from the track so that horizontal sections of pipe may be carried either toward or away from the track. Since the construction and mounting of the conveyor belts in the racking conveyors are identical, only the aft chain in the starboard racking conveyor will be described in detail.

Referring to FIG. 3, the aft belt has its outboard portion disposed around a starboard drive sprocket 140 which is keyed to a rotatable starboard drive shaft 141 extending from the aft end of the track to the forward racking conveyor belt. The inboard end of the belt is disposed around an idler sprocket 142 adjacent the track and mounted on a longitudinal and horizontal idler shaft 143 which extends from the aft end of the track to the forward racking conveyor chain. The belt is made up of pairs of spaced links 144 pivotally connected end to end by link pins 146. A link pin roller 148 is mounted on each link pin between the link pairs. The link pin rollers are adapted to roll on upper and lower wearing strips 150, 151, respectively, mounted on the upper and lower surfaces of a transverse divider 152 which extends from the inner periphery of the idler sprocket to the inner periphery of the drive sprocket. Preferably, the structural divider is a pair of vertically spaced channel beams 153 opening toward each other and secured at each side to structural runners 154 which are a pair of spaced channel beams which each open outwardly away from the divider proper, and extend inwardly from the outer end of the divider past the idler sprocket to terminate adjacent the track. The structural runners are attached adjacent the track by a pair of support beams 155 to the upper flange of an I-beam 156 which extends across the floating vessel to support the aft chain belts for both the starboard and port racking conveyors.

An outside wearing strip 157 begins adjacent the track just below the idler shaft and is spaced from and curved to fit the contour of the belt around the lower portion of the idler sprocket. The outside wearing strip extends along and is welded to the top of the flange of I-beam 156 and is curved at its outboard end around the aft chain drive sprocket and terminates at its upper end over the drive shaft. The outer end of the outside wearing strip is supported by a pipe conveyor cage 158, which is secured to the outer end of the upper flange of I-beam 156.

Each link of the belt has an outwardly extending pipe retainer 159 which has concave sides to fit the curvature of the drill pipe. A separate pipe retainer support roller 160 is mounted on a separate transverse shaft 161 secured at each end to each pair of pipe retainers. The pipe retainer support rollers are adapted to bear against the outside wearing strip.

Thus, adjacent pipe retainers form a storage space in which a section of drill pipe may be stored and securely held. As the chain belt moves around each sprocket, the adjacent links are pivoted with respect to each other and the pipe retainers are spread apart. The drill pipe is prevented from falling out of the outboard end of the chain belt by the outside wearing strip. As the chain is rotated so that its upper portion moves outboard and around the idler sprocket, the pipe retainers are successively spread and then closed, picking up successive sections of drill pipe which roll outboard after being displaced by the pipe throw-out arms on to an adjustable ramp 162, which is set as shown in FIGS. 3 and 9. To move pipe in the other direction, the ramp is set as described below so that its inner end is lower than its outer end, and as the conveyor belt is moved so that its upper portion moves inboard and around the idler sprocket, the pipe retainers are successively spread open, permitting successive sections of pipe to roll inboard on the ramp and into the track where the aft end of the drill pipe comes to rest on the carriage at the rear of the track, and the forward portion of the drill pipe rests on the lifter roller.

The detailed construction and operation of the ramp can best be understood from reference to FIGS. 3 and 9. The upper portion of the inner end of each runner 154 is cut away to form a notch 163 which has a transverse surface that extends outwardly and upwardly from adjacent the carriage track. The outboard end of a ramp arm 164 is connected by pivot 165 to the aft side of the upper portion of aft runner 154 at the outboard end of notch 163.

As shown most clearly in FIG. 9, the ramp arm extends inwardly and upwardly so that its inner end rests on a ramp support block 166 which in turn rests on the top of track 22. The ramp support block is secured by a pivot 167 to the inner end and upper edge of aft runner 154. As shown in FIG. 9, the ramp is set so that pipe will roll from the track to the racking conveyor.

To insure that a section of drill pipe remains in the proper position to be loaded on to the racking conveyor after being delivered on to the ramp from the track, even when the ship is rolling under heavy wave action, a pipe stop dog 168 is secured to a pivot 169 and disposed near an intermediate portion of the ramp arm. Pivot 169 extends perpendicular to the ramp arm and the forward end of pivot 169 is in a longitudinal slot 170 formed in the aft side of the ramp arm. The outboard end of the slot 170 turns downwardly and opens out the bottom of the ramp arm. Thus, pivot 169 can be slipped up into and down out of slot 170. Pivot 169 is attached at its aft end to the inboard end and forward side of a stop arm 171 which is pivotally secured at its outboard end around the idler shaft. A tension spring 172 is connected at one end to the dog below pivot 169, and at its other end to an intermediate portion of the stop arm. A dog stop 173 extends from the stop arm at a point just outboard of the outer end of spring 172 and terminates adjacent the lower end of dog 168. Thus, as shown most clearly in FIG. 9, the upper end of the dog projects above the ramp arm and the lower end of the dog bears against the dog stop. When a section of drill pipe rolls down the ramp arm, the dog pivots in a clockwise direction (as viewed in FIG. 9) to permit the section of pipe to roll into the space between the dog and the adjacent pipe retainer on the racking conveyor belt. The tension spring returns the dog to the position shown in FIG. 9, and the pipe is held snugly in the position shown in phantom line until the pipe retainer conveyor belt can be actuated to move the upper portion of the belt in an outboard direction so that the section of pipe is then held between adjacent pipe retainers. This procedure is repeated until storage of pipe on the conveyor is completed.

When it is desired for pipe to move in the opposite direction, i.e., from the conveyor on to the track, the ramp arm 164 is lifted, the ramp support 166 is pivoted in a clockwise direction (as viewed in FIG. 9) so that it rests below the track, and the ramp arm is then lowered to rest on the upper edge of the track (see FIG. 13), so that pipe will roll from the racking conveyor on to the track and carriage as mentioned above.

When the ramp arm is to be lowered so that pipe can be discharged from the conveyor on to the track, the inner end of the ramp arm is raised sufficiently so that the pivot 169 slides out of slot 170, and the stop arm and dog, and ramp support block are then lowered out of the way. The ramp arm is then lowered to rest on the track so that pipe can roll freely from the conveyor on to the track (see FIG. 13).

Figure 5:
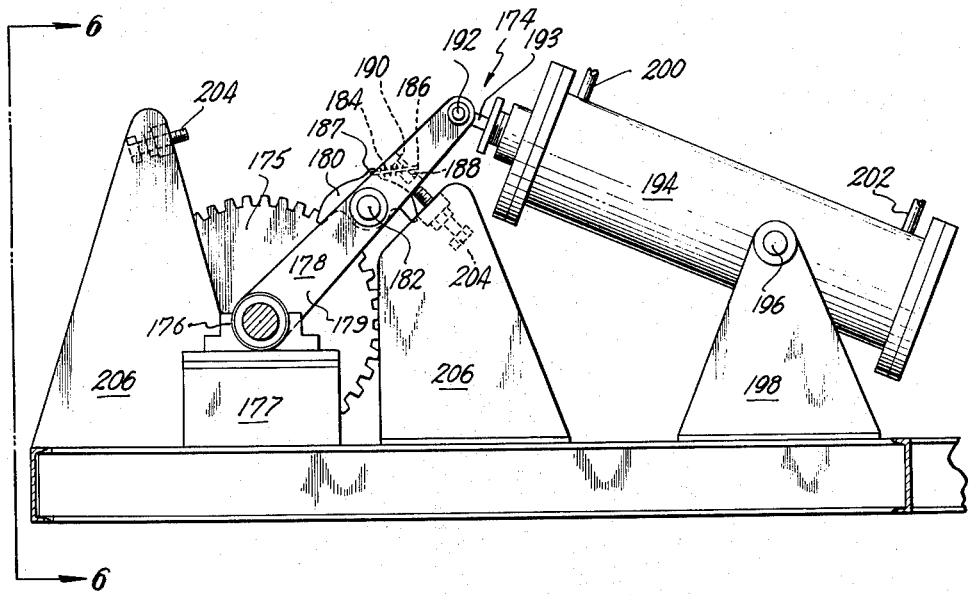
FIG. 5 is a side elevation taken on line 5—5 of FIG. 2 of the drive arrangement for the racking conveyor shown in FIG. 3.
Figure 6:
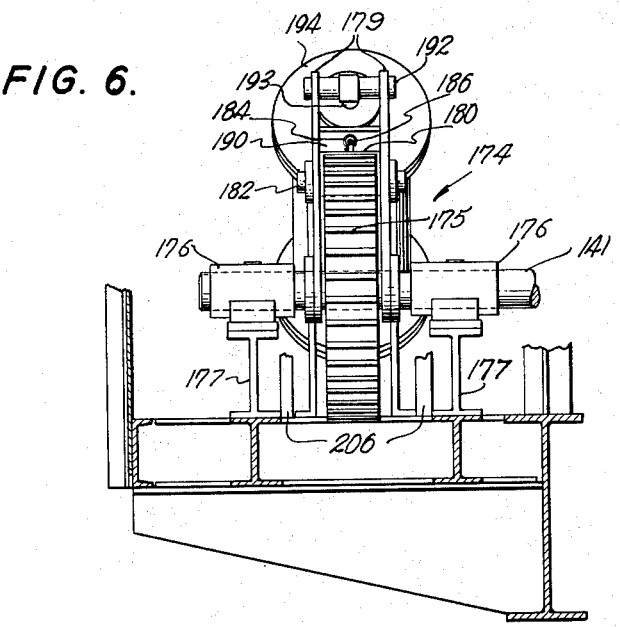
FIG. 6 is a view taken on line 6—6 of FIG. 5.
Figure 10:
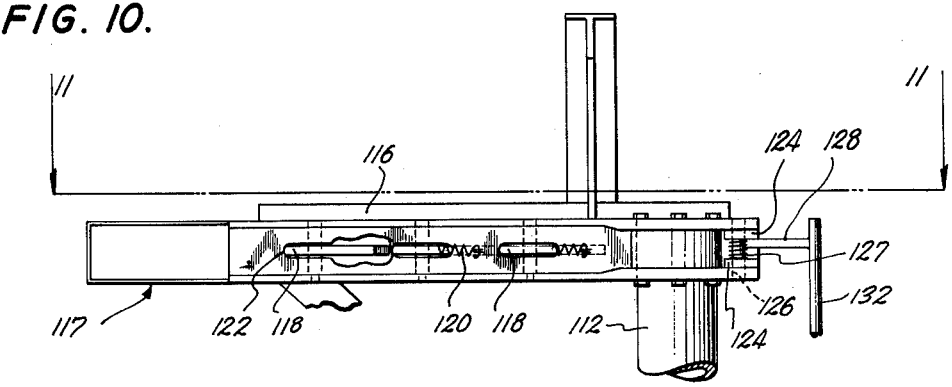
FIG. 10 is a fragmentary view, partially broken away, taken on line 10—10 of FIG. 2b.
Figure 11:
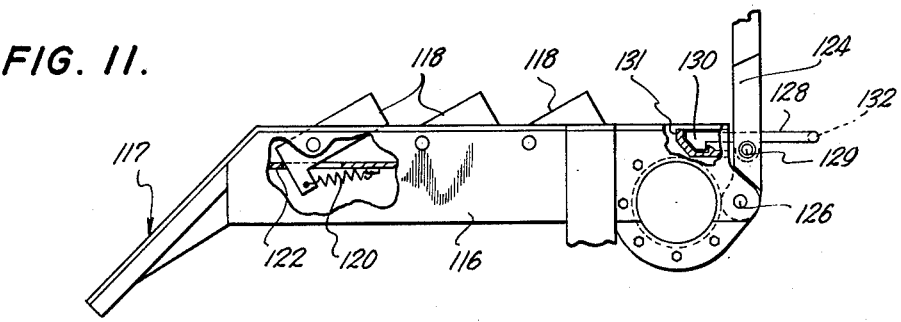
FIG. 11 is a fragmentary view, partially broken away, taken on line 11—11 of FIG. 10.

Referring to FIGS. 2a, 5 and 6, a starboard conveyor drive 174 at the aft end of the starboard conveyor drive shaft is adapted to rotate the drive shaft and thereby move the racking conveyor belts to carry pipe toward or away from the track. The starboard conveyor drive includes a gear drive wheel 175 keyed to the aft end of the starboard conveyor drive shaft. The aft end of the starboard conveyor drive shaft is journalled in a pair of pillar blocks 176 mounted on each side of the gear drive wheel and supported by braces 177. A conveyor drive lever 178 includes a pair of laterally spaced, inwardly and upwardly extending lever arms 179 which are pivotally attached at their lower ends on opposite sides of the conveyor drive wheel. A conveyor lever pawl 180 is mounted on a horizontal and longitudinal pivot 182 in an intermediate portion of the lever between the two lever arms. A compression pawl spring 184 is disposed around a pawl pin 186 which is pivotally attached at its outboard end to the upper end of a projection 187 on the center portion of the lever pawl. The inboard end of the pawl pin extends through an opening 188 in a block 190 welded between the two lever arms above the pawl. The pawl spring is compressed between the block and the projection on the pawl.

The upper end of the lever arms are connected by a horizontal and longitudinal pivot 192 to the upper end of a downwardly and inwardly extending conveyor drive piston 193 which is disposed in a pneumatic starboard conveyor cylinder 194 connected by a horizontal and longitudinal pivot 196 intermediate its ends to a pair of supports 198 on opposite sides of the cylinder. Pneumatic lines 200 and 202 are used to supply pressure to the outboard and inboard ends, respectively, of the cylinder so that the piston may be worked back and forth in the cylinder.

As shown in FIG. 5, the spring operated pawl is set to be urged by its spring in a counter-clockwise direction, so that its outboard end engages the teeth of the drive wheel, and as the lever is moved in a counter-clockwise direction, the drive wheel is rotated to carry pipe away from the track. Outboard and inboard adjustable stop screws 204 are mounted in abutments 206 on opposite sides of the lever to limit the amount of travel of the lever arm. As shown in FIG. 5, the stops are arranged so that the gear drive wheel can be rotated from its shown position about 65° in a counter-clockwise direction, which moves the starboard conveyor belts in a direction to carry pipe away from the track. To effect further rotation of the gear drive wheel after the lever abuts the outboard stop, the piston is forced back into the cylinder and the pawl slides over the gear teeth to permit the lever to return to the position shown in FIG. 5. If the gear drive wheel is to be rotated in the opposite direction, the spring operated pawl is rotated manually in a clockwise direction (as viewed in FIG. 5) so the inboard end of the pawl pin passes through the center line of the pawl pivot, causing the pawl spring to urge the pivot in a clockwise direction so that the inboard tooth of the pawl engages the gear drive wheel teeth. In this position, as the lever piston is reciprocated, the gear drive wheel is turned in the clockwise direction, and the starboard racking conveyor belts are moved to carry pipe toward the track. The port conveyor drive shaft is powered by a port conveyor drive which is identical to that just described for the starboard conveyor.

Figure 12:
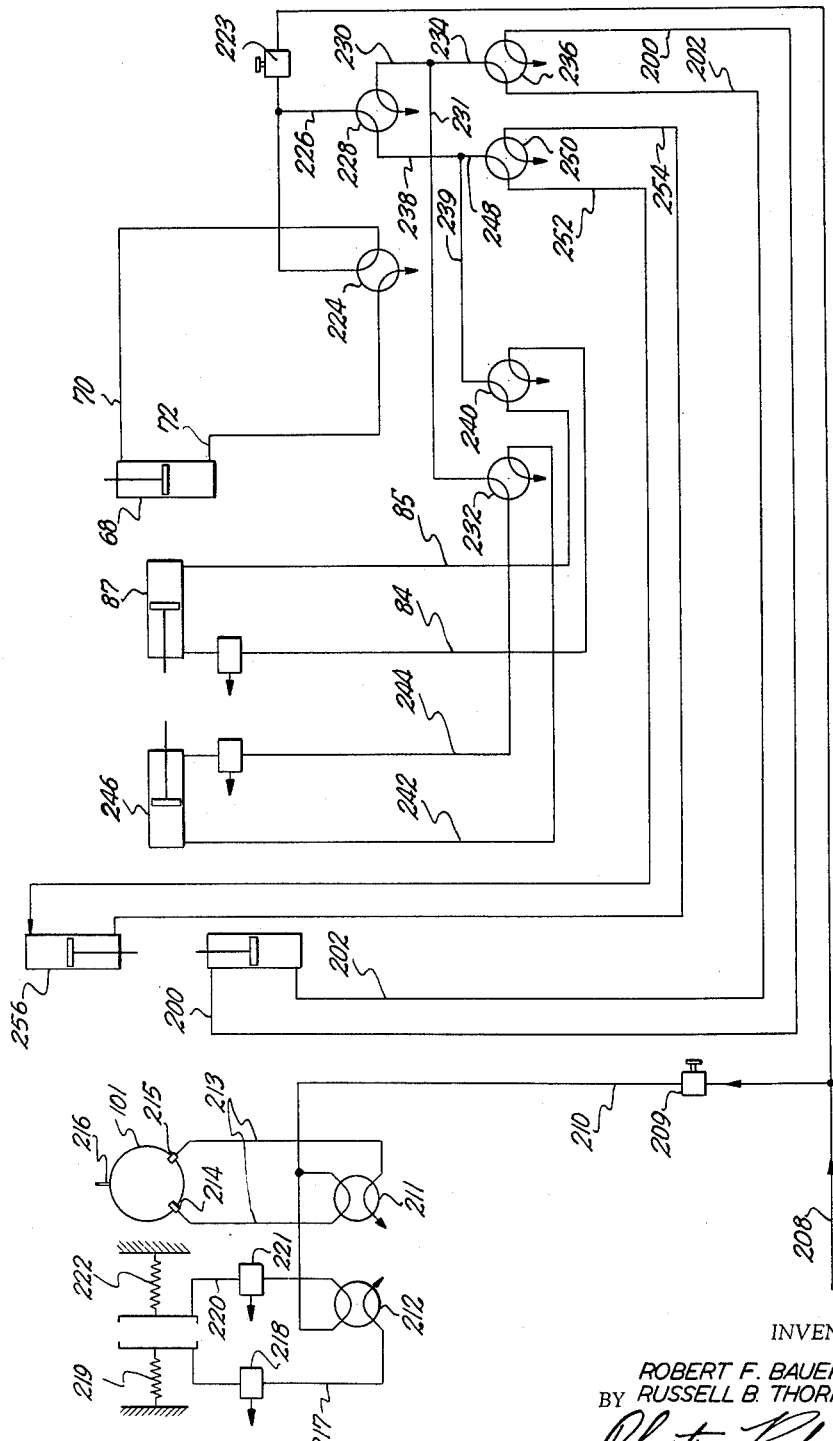
FIG. 12 is a schematic piping diagram which shows how the various power units of the apparatus are actuated.

The system for actuating the various units of this invention is shown in the schematic diagram in FIG. 12. A main supply line 208 furnishes compressed air through a first pressure regulator 209 in a motor control line 210 connected to a two-way motor direction control valve 211 and a motor actuation control valve 212. A pair of motor power supply lines 213 are connected to opposite sides of the motor direction control valve and to forward and reverse inlets 214, 215, respectively, of the carriage motor 101. Spent air exhausts from the motor through an exhaust line 216. As shown in FIG. 12, the motor direction control valve is set to supply air pressure into the forward inlet of the motor so that air passes through the motor and out the exhaust to drive the motor in the forward direction, i.e., the direction which would move the carriage toward the rig. The motor may be driven in the reverse direction by rotating the motor direction control valve 90° in a clockwise direction so that air pressure is supplied to the reverse inlet of the motor. A clutch power supply line 217 is connected between the motor actuation control valve and the clutch. A clutch exhaust valve 218 is in line 217 so that when the motor actuation control valve 212 is in a neutral position, i.e., set so that the air supply is cut off from both the brake and the clutch, the exhaust valve can be opened and permit a tension spring 219 to pull the clutch to a disengaged position. A brake supply line 220 is connected between the motor actuation control valve and a brake for stopping and holding the carriage in a fixed position. A brake exhaust valve 221 is in line 220 so the brake may be pulled to a disengaged position by a tension spring 222 when the motor actuation control valve is set in a neutral position and valve 221 is opened. As shown in FIG. 12, the motor actuation control valve is set to supply air to the brake so that the carriage is held in place. The brake may be released and the clutch engaged so that the motor drives the carriage by rotating the motor actuation control valve 90° in a clockwise direction.

Air pressure is furnished through supply line 208 through a second pressure regulator 223 to a lifter control valve 224. Lifter control lines 70, 72 are connected to opposite sides of the lifter control valve and are connected to opposite ends of the lifter cylinder 68. With the lifter control valve in the position shown in FIG. 12, air pressure is supplied to the upper end of the lifter cylinder to hold the lifter arm in a retracted, or lowered, position. The lifter arm is raised by rotating the valve 224 90° in a clockwise direction from the position shown. Air is also supplied from the second pressure regulator 223 through a line 226 to a master throw-out control valve 228 which is connected by line 230 and a branch line 231 to a starboard throw-out control valve 232, and by a branch line 234 to a starboard conveyor control valve 236, which in turn is connected by lines 200, 202 to opposite ends of the starboard conveyor cylinder 194.

The master throw-out control valve 228 is also connected by a line 238 and a branch line 239 to a port throw-out control valve 240, which in turn is connected by lines 84, 85 to opposite ends of the starboard throw-out cylinders 95. A branch 248 connects the master control valve to a port conveyor control valve 250 which is connected by lines 252, 254 to opposite ends of a port conveyor cylinder 256.

In the operation of the apparatus to move pipe from the starboard racking conveyor to the drilling rig for lowering into the well, the spring operated pawl of the starboard conveyor drive is rotated clockwise from the position shown in FIG. 5 so the pawl spring urges the inboard pawl tooth to engage the drive gear teeth. The starboard piston is moved outboard by air pressure supplied through line 202 to the starboard conveyor drive cylinder through valve 236 which is set in the position shown in FIG. 12, the master control valve 228 being first rotated 90° in a counter-clockwise direction from the position shown in FIG. 12. After the piston is moved to its outboard limit, valve 236 is reversed so that air pressure is supplied to the cylinder through line 200 to force the piston inboard. This rotates the starboard conveyor drive lever in a counter-clockwise direction and causes the upper portion of the starboard conveyor chains to move toward the track. The chains are moved far enough to cause the pipe retainer with a section of pipe nearest the track to open up and permit the pipe to roll across the skid, which is set as described above for moving pipe to the track, and into the track. The pipe comes to rest with its rear end on the carriage, which is at the aft end of the track, and the forward end of the section of pipe rests on the lifter roller which is in the lower position established when the pipe lifter arms are horizontal. Lifter control valve 224 is rotated 90° in a clockwise direction from the position shown in FIG. 8 so that air pressure is supplied through line 72 to the underside of the lifter piston, causing the piston to raise the lifter arm and roller to the dotted line position shown in FIG. 1b. The motor direction control valve 211 is then set to the position shown in FIG. 12 so the motor is driven in a forward direction. The motor actuation control valve 212 is then turned 90° in the clockwise direction from the position shown in FIG. 12 to supply pressure to engage the clutch with the motor, so that the carriage cable driving drum is turned in a clockwise direction as viewed in FIG. 1a to drive the carriage forward. The carriage is advanced far enough to carry the forward end of the pipe to the dotted line position shown in FIG. 1b. The motor actuation control valve is then set in a neutral position and the clutch exhaust valve opened so the clutch is disengaged by spring 219 and the carriage and its cable may be freely moved. The forward end of the pipe is then latched in the elevators (not shown) and raised by the drilling rig draw works (not shown), the lower end of the pipe riding on the carriage and pulling the carriage toward the rotary table by virtue of engagement of the pipe collar with the shoulder at the forward end of the carriage.

Ordinarily, the elevator and pipe are raised rapidly so that the lower end of the pipe leaves the carriage and swings toward the rig with considerable velocity when the pipe is almost in the vertical position. The carriage coasts to a stop near the inner end of the track, or else is stopped by engaging the stop at the inner end of the track. The lower end of the pipe swings into the space between the pick-up post arms and forces its way past the pick-up post pawls against the pick-up post gate. The lower end of the pipe is thus securely held in place against further movement due to pitching and rolling of the floating vessel or to reaction from the hoisting system. The pick-up post gates are then opened, allowing the lower end of the pipe to swing over the rotary table. The lower end of the suspended pipe is then screwed into the upper end of a section of pipe at the upper end of the drill string suspended by slips (not shown) in the rotary table.

The above operation is repeated as many times as is necessary to provide the required number of sections of drill pipe, the lifting roller and the carriage each being returned to their respective starting positions before the succeeding section of pipe is rolled on to the track.

To remove pipe from the well, the pick-up post is removed from its socket and the above procedure is substantially reversed. A section of drill pipe is hoisted up into the derrick and unscrewed at its lower end from the drill string. The lower end of the free section of drill pipe is then guided manually over the track and disposed on the carriage, which previously was advanced to its most forward position. Then with both the clutch and the brake disengaged, the section of pipe is lowered, and due to the slight incline of the inner end of the track, the carriage is forced outwardly. The drill pipe is lowered to approximately the position shown in dotted lines in FIG. 1b, and the lifter roller is raised to engage the forward portion of the drill pipe. The upper end of the pipe section is disengaged from the elevators. The carriage is then retracted to its rearmost position on the track, and the lifter roller is lowered to return the pipe to the rest position in the track.

The starboard throw-out cylinder is then actuated by moving the starboard throw-out valve to the position shown in FIG. 12. This causes the starboard throw-out piston and rods to move forward and raise the starboard throw-out arms and throw-out rollers which lift the pipe from the track and displace it laterally on to the fore and aft ramps and into the respective spaces between the dogs on the ramps and pipe retainers on the starboard racking conveyor chains. The starboard conveyor drive pawl is returned to the position shown in FIG. 5, and the conveyor drive is actuated to carry the section of pipe outboard, and position the next pipe retainer in the receiving position for the next pipe section.

The pipe racking procedure proceeds as described above, the sections of pipe being carried outboard, around the drive sprocket, and then inboard again on the under side of the racking conveyor chains. The outside wearing strip keeps the pipe in place as it goes around the drive sprocket and as it moves down along the bottom portion of the chain. The link pin rollers and the pipe retainer support rollers of the racking conveyor chains ride on the upper, lower, and outside wearing strips to transfer the pipe load from the chain to the structural divider and the lower portion of the outside wearing strip.

Thus, as each section of pipe is removed from the well, it is quickly and safely stored in the racking conveyor. Moreover, as the pipe is moved on to or off of the racking conveyor, practically all of the mass of the sections of drill pipe is kept in a fixed stable position.

We claim:
1. A drill pipe handling and racking apparatus for a drilling rig comprising:
 (a) a track extending from an inner end adjacent the drilling rig to an outer end remote from the rig,
 (b) a carriage adapted to travel on the track and including:
  (1) means for supporting a drill pipe disposed longitudinally with respect to the track,
 (c) pipe raising means spaced apart longitudinally of the track and operable to raise the drill pipe from its supported position on the carriage and to displace the pipe laterally,
 (d) a ramp support block having a pivotal connection enabling the support block to be supportably positioned on one side of the track to extend vertically above the track in a first position, and to be disposed away from the track in a second position, the support block being cooperatively positioned relative to the pipe raising means in the first position to guide the pipe as it is raised;
 (e) a ramp arm extending from the track toward a pipe storage location, and having one end adjacent the track to be supportable by the support block in its first position and the other end removed from the track; and
 (f) a connection supporting the other end of the ramp arm for pivotable movement,
  (1) the connection being above the track and being vertically disposed relative to the top of the support block whereby the ramp arm slopes downwardly from the support block in the first position of the support block and downwardly toward the track in the second position of the support block.

2. A drill pipe handling and racking apparatus for a drill rig comprising:
 (a) a track extending from an inner end adjacent the drilling rig to an outer end remote from the rig,
 (b) a carriage adapted to travel on the track between an outer and an inner position and including:
  (1) means for supporting a portion of a drill pipe disposed longitudinally with respect to the track,
 (c) lifter means disposed adjacent the inner end of the track operable to move the end of the pipe nearer the rig between a lower position and an upper position above the track,
 (d) means operatively engaging the carriage for moving the carriage when the inner end of the pipe is in the upper position and thereby pushing the pipe toward the rig,
 (e) a pipe storage location disposed longitudinally of the track above and along the outer end thereof,
 (f) pipe raising means beneath the outer end of the track operable to lift the pipe from its supported position on the carriage and to displace it laterally to a raised position, (g) a ramp support block having a pivotal connection enabling the support block to be supportably positioned on one side of the track to extend vertically above the track in a first position, and to be disposed away from the track in a second position, the support block being cooperatively positioned relative to the pipe raising means in the first position to guide the pipe as it is raised;

(h) a ramp arm extending from the track toward the pipe storage location and having one end adjacent the track to be supportable by the support block in its first position and the other end removed from the track; and (i) a connection supporting the other end of the ramp arm for pivotable movement,
   (1) the connection being above the track and being vertically disposed relative to the support block whereby the ramp arm slopes downwardly from the support block in the first position of the support block and downwardly toward the track in the second position of the support block.

3. A drill pipe handling and racking apparatus for a drilling ring comprising:

(a) a pair of spaced apart rails defining a track extending from an inner end adjacent the drilling rig to an outer end remote from the rig, (b) a carriage on the track movable between an outer position and an inner position and including:
   (1) means for supporting a drill pipe disposed longitudinally with respect to the track, (c) a pipe storage and racking means disposed longitudinally of the track along the outer end thereof, (d) a plurality of longitudinally spaced pipe throw-out members located beneath and between the rails, (e) selectively operable means connected to the throw-out arms for urging the throw-out members upwardly between the rails to raise the pipe from the supported position on the carriage, (f) a ramp support block having a pivotal connection enabling the support block to be supportably positioned on one rail of the track to extend vertically above the track in a first position, and to be disposed away from the track in a second position, the support block being cooperatively positioned relative to the pipe raising means in the first position to guide the pipe as it is raised;

(g) a ramp arm extending from the track toward the pipe storage and racking means and having one end adjacent the track to be supportable by the support block in its first position and the other end removed from the track; and (h) a connection supporting the other end of the ramp arm for pivotable movement,
   (1) the connection being above the track and being vertically disposed relative to the support block whereby the ramp arm slopes downwardly from the support block in the first position of the support block and downwardly toward the track in the second position of the support block.

4. Apparatus in accordance with claim 3 wherein:
(a) the upper surface of each throw-out member is adapted to engage the underside of the drill pipe track and is inclined with respect to the horizontal so that as the throw-out members are raised the pipe is urged into contact with the ramp support block and then is laterally displaced onto the ramp arm.

References Cited in the file of this patent

UNITED STATES PATENTS

| | | |
|---|---|---|
| 2,210,531 | Engelbaugh | Aug. 6, 1940 |
| 2,231,087 | Protin | Feb. 11, 1941 |
| 2,358,292 | Malhiot | Sept. 12, 1944 |
| 2,536,057 | Hodson et al. | Jan. 2, 1951 |
| 2,615,585 | Menhall | Oct. 28, 1952 |
| 2,631,741 | Tucker | Mar. 17, 1953 |
| 2,643,006 | King | June 23, 1953 |
| 2,656,052 | Tucker | Oct. 20, 1953 |
| 2,852,147 | Maydew | Sept. 16, 1958 |
| 2,900,091 | Minter | Aug. 18, 1959 |